United States Patent
Niemela

[11] Patent Number: 5,861,694
[45] Date of Patent: Jan. 19, 1999

[54] FIELD RETAINING MECHANISM FOR A PERMANENT MAGNET D.C. MOTOR

[75] Inventor: Paul W. Niemela, Pickens, S.C.

[73] Assignee: Ryobi North America Inc., Anderson, S.C.

[21] Appl. No.: 671,007

[22] Filed: Jun. 28, 1996

[51] Int. Cl.[6] .......................... H02K 21/26; H02K 5/00; H02K 5/15
[52] U.S. Cl. ........................................ 310/154; 310/89
[58] Field of Search ...................... 310/42, 47, 50, 310/154, 89, 218; 403/262, 337

[56] References Cited

U.S. PATENT DOCUMENTS

| | | | |
|---|---|---|---|
| 3,361,277 | 1/1968 | Ferdig et al. | 310/154 |
| 3,519,858 | 7/1970 | Morganson | 310/47 |
| 3,663,850 | 5/1972 | Phelon | 310/154 |
| 4,071,794 | 1/1978 | Schoen | 310/154 |
| 4,412,145 | 10/1983 | Voss et al. | 310/154 |
| 4,580,072 | 4/1986 | Morishita | 310/154 |
| 4,587,449 | 5/1986 | West | 310/154 |
| 4,636,107 | 1/1987 | Casler | 310/154 |
| 4,682,066 | 7/1987 | Abbratozzato et al. | 310/154 |
| 4,953,284 | 9/1990 | Hammer | 310/154 |
| 4,973,871 | 11/1990 | Bisantz | 310/154 |
| 5,073,738 | 12/1991 | Tang | 310/91 |
| 5,200,658 | 4/1993 | Kohno et al. | 310/89 |
| 5,619,084 | 4/1997 | Lau | 310/154 |

*Primary Examiner*—Clayton LaBalle
*Attorney, Agent, or Firm*—Brooks & Kushman P.C.

[57] ABSTRACT

A generally T-shaped clip is fit into notches formed in the field shell of a permanent magnet D.C. motor. The clip has a passageway formed through its top surface for receiving a screw or the like to secure the field shell to a surrounding tool housing. The notches have a top portion with an elongated portion that has a concave inner side to abut the outer surface of the field shell and retain the clip in the notches. The clip has a bottom portion that is bent so that it contacts the screw to prevent it from turning and loosening.

7 Claims, 3 Drawing Sheets

FIELD RETAINING MECHANISM FOR A PERMANENT MAGNET D.C. MOTOR

TECHNICAL FIELD

The present invention relates to a method and apparatus for attaching the field shell of a motor to a surrounding housing. More specifically, the present invention relates to a field retaining clip for securing the field shell of a permanent magnet D.C. motor to a surrounding tool housing.

BACKGROUND OF THE PRESENT INVENTION

The use of universal motors, including a field coil and a stator coil, to operate various tools is well known in the art. The field coil is excited with an electrical current from a power source, such as a typical electrical outlet. The field coil then rotates to induce an electrical current in the stator coil and provide the necessary power to operate the tool. Universal motors are typically attached to the tool housing by mount screws that are screwed through both the motor housing and the tool housing.

Permanent magnet D.C. motors are also known for use in operating tools. The permanent magnet D.C. motors include a field shell with a plurality of permanent magnets attached to the inside of the shell. Centered within the field shell is an armature core. A commutator is located outside of the field shell and is connected to a pair of coil windings that provide electrical current to the armature core to drive the armature. Once the armature has begun rotating, the polarity of the permanent magnets and the resultant magnetic field, drive the armature such that a shaft extending out of the field shell is driven, thus driving the power tool.

The permanent magnet motor assembly cannot be drilled for mounting screws because of its thickness, thus other methods and apparatus for attaching the field shell of these motors to the motor housing have been utilized. These methods and apparatus typically extend from the sides or the ends of the permanent magnet motors thus taking up valuable space. These methods and apparatus are also time consuming and expensive to manufacture.

SUMMARY OF THE INVENTION

It is an object of the present invention to provide a method and apparatus for attaching a permanent magnet D.C. motor to a tool housing that is less cumbersome, cheaper, and takes up less space in the tool housing than prior methods and apparatus.

In accordance with the objects of the present invention, a field shell retaining mechanism is disclosed. The field shell retaining mechanism is for use in a tool having a tool housing and a permanent magnet D.C. motor located within the housing. The permanent magnet D.C. motor includes a field shell with an inner and outer surface. The field shell also has a plurality of notches formed therein.

The field shell retaining mechanism is a generally T-shaped clip having a bottom portion. The top portion has an elongated head region, with an inner side and an outer side, a neck region, and a body region. The elongated head region of the top portion has a width larger than the width of each of the notches formed in the field shell. The dimensions of the notches and the generally T-shaped clip will cause the inner side of the elongated head region of the clip to abut the outer surface of the field shell and retain the clip in the notch.

The neck region of the top portion has approximately the same width as the notch formed in the field shell. The body region has a passageway formed therethrough that is sized to accept a fastener for attaching and securing the field shell of the permanent magnet D.C. motor to the tool housing. Additionally, the leg region of the bottom portion of the clip is bent such that its inner side is in contact with the fastener to prevent it from loosening and preventing the field shell from becoming detached from the tool housing.

Additional features and advantages of the present invention will become apparent to one of skilled in the art upon consideration of the following detailed description of the present invention.

BRIEF DESCRIPTION OF THE DRAWING

A preferred embodiment of the present invention is described by reference to the following drawings.

DESCRIPTION OF THE PREFERRED EMBODIMENTS

Figure 1:
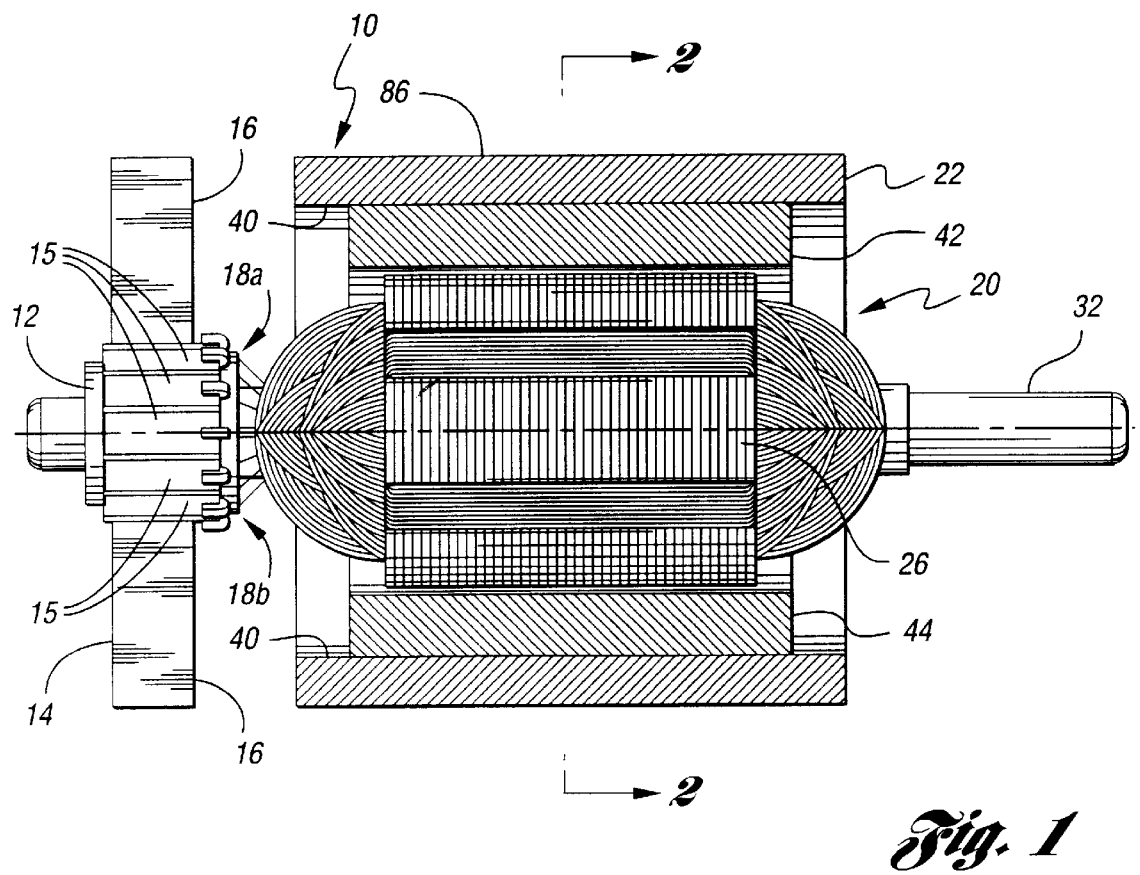
FIG. 1 is a partial cross-sectional view of a permanent magnet D.C. motor.
Figure 2:
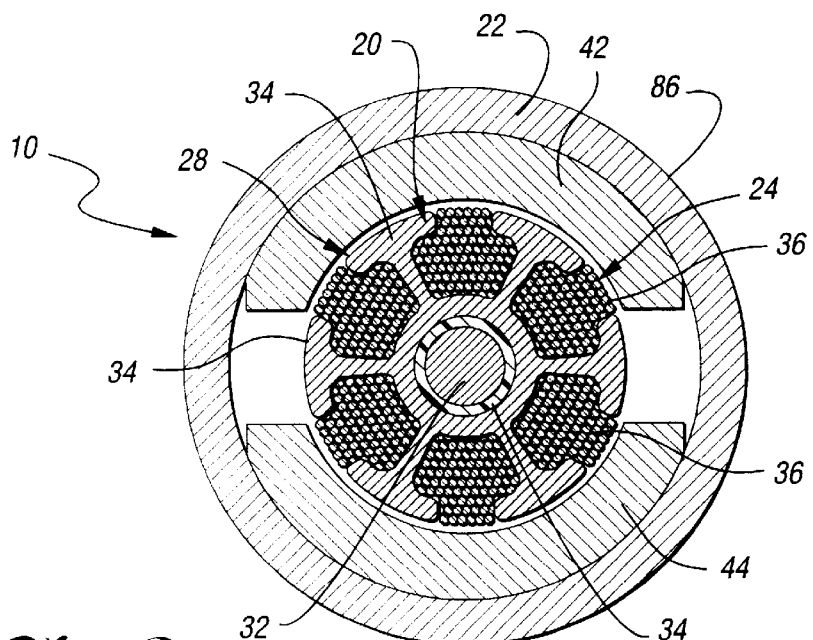
FIG. 2 is a cross-sectional view of the permanent magnet D.C. motor along the line 2—2 in FIG. 1.

FIGS. 1 and 2 illustrate a permanent magnet D.C. motor 10, in accordance with a preferred embodiment of the present invention. The motor 10 has a commutator 12 that is surrounded by carbon brushes 14 on either side. The brushes 14 are attached to a direct current power source such as a full wave bridge rectifier via connection 16 which is connected to an alternating current electrical outlet (not shown). The commutator 12, which is a cylindrical arrangement of conductive metal bars 15, is intermittently connected to the pair of brushes 14. Each bar 15 is connected to an end of a wire forming one of a plurality of coil windings 18a, 18b, and 18c to induce current in the armature core 20. The commutator 12 is located outside a field shell 22, while the armature core 20, which consists of a plurality of wound copper wire coils 18a, 18b, and 18c surrounding a laminate stack 26, is located within the field shell 22 and rotates after being excited by current from the commutator 12. The laminate stack 26 comprises an aligned stack of identical laminates 28. Each laminate 28 includes a central shaft aperture 30 which is larger in diameter than the shaft 32. About the periphery, each laminate 28 is formed with a series of evenly spaced radial arms 34 defining therebetween armature core slots 36.

Although the wire comprising the coils 18a, 18b, and 18c is insulated, the present invention provides for additional insulating material isolating the armature core 20 from the shaft 32 and the shaft 32 from the wire coils 18a, 18b, and 18c. To this end, an annular lining 24, preferably formed from plastic, surrounds the shaft 28 to insulate it. Coil windings 18a, 18b, and 18c extend from selected commutator bars 15 and through appropriate ones of the armature core slots 36. Of course, more or less coil windings may be utilized as this invention is not limited solely to the use of three wound coil windings.

Figure 3:
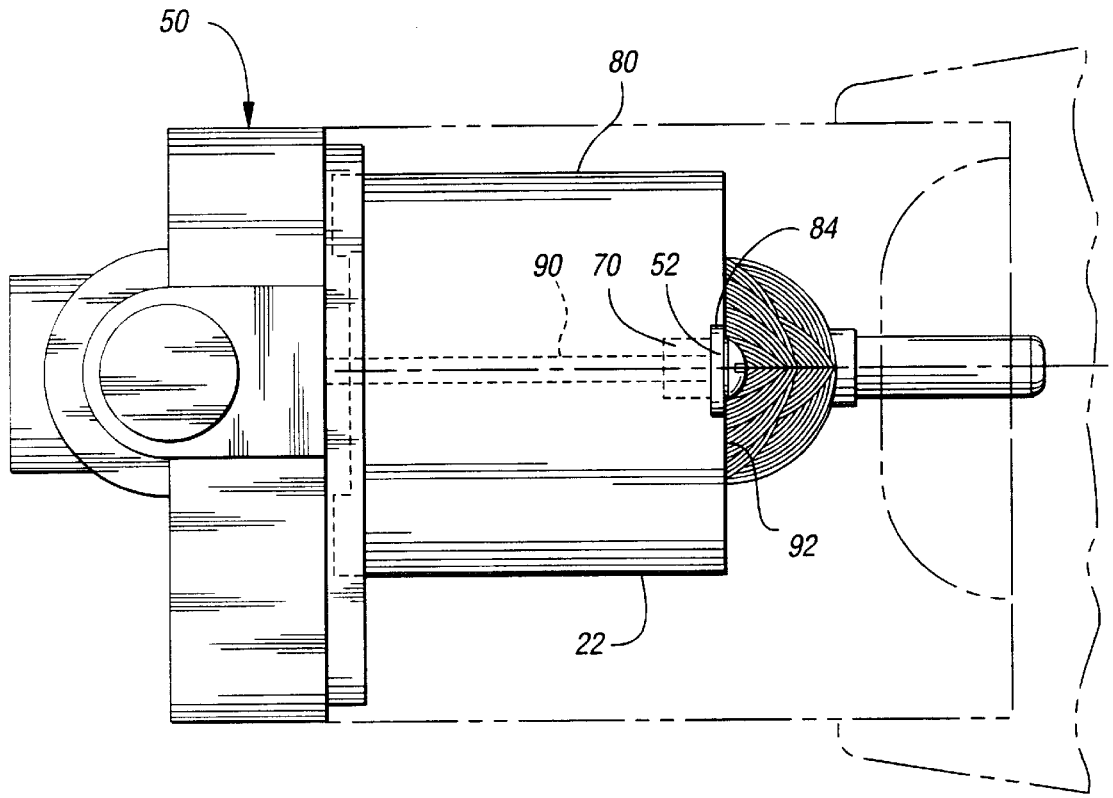
FIG. 3 is a side view of a permanent magnet D.C. motor attached to a tool housing by a field retaining clip in accordance with a preferred embodiment of the present invention.

The field shell 22 has an inner side 40 to which two permanent magnets 42, 44 are attached. The permanent magnets 42, 44 are of opposite polarity and drive the armature 20 once it has begun to rotate due to the polarity of windings 18a, 18b, and 18c. As the armature 20 rotates, it drives the shaft 32 that extends from the field shell 22 to operate a tool (FIG. 3). The field shell 22 is preferably constructed of steel. When the armature 20 is positioned within the field shell 22, the magnetization between the armature 20 and the permanent magnets 42, 44 preferably produces the compass indications 46 illustrated in FIG. 4.

Figure 4:
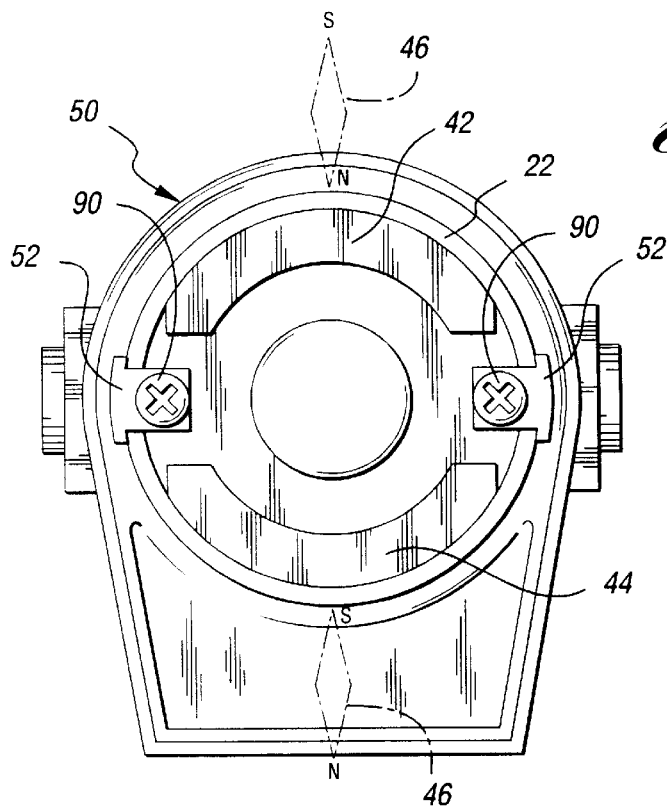
FIG. 4 is an end view of a permanent magnet D.C. motor attached to a tool housing by a field retaining clip in accordance with a preferred embodiment of the present invention.
Figure 5:
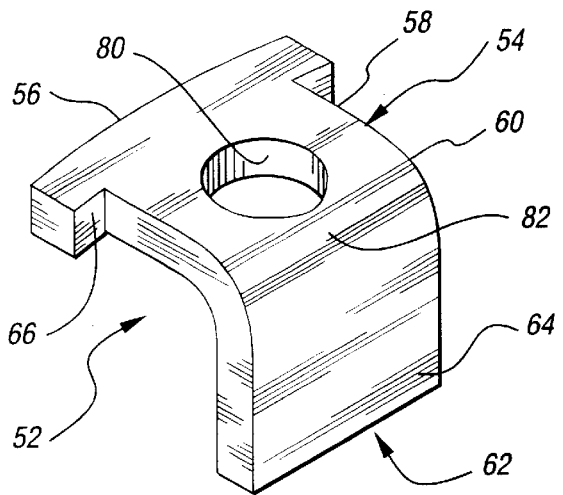
FIG. 5 is a perspective view of a field retaining clip in accordance with a preferred embodiment of the present invention.
Figure 6:
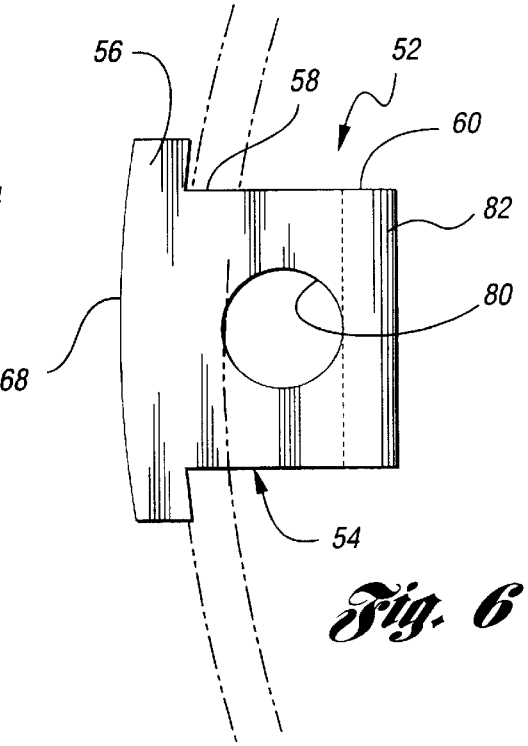
FIG. 6 is a top view of the field retaining clip of FIG. 5 in accordance with a preferred embodiment of the present invention.
Figure 7:
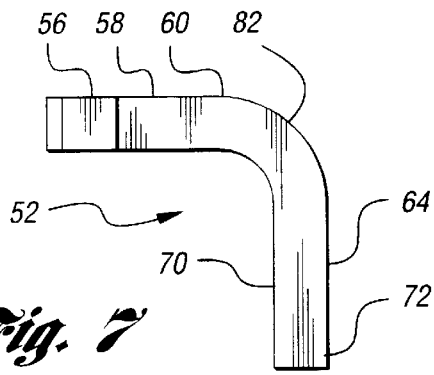
FIG. 7 is a side view of the field retaining clip of FIG. 5 in accordance with a preferred embodiment of the present invention.
Figure 8:
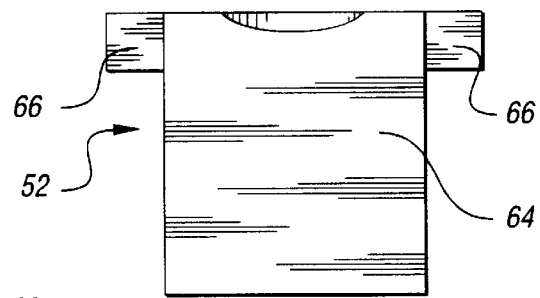
FIG. 8 is a front view of the field retaining clip of FIG. 5 in accordance with a preferred embodiment of the present invention.

The permanent magnet D.C. motor 10 of the present invention is intended for inclusion within a tool housing 50, as shown in FIGS. 3 and 4. The mechanism for attaching the permanent magnet D.C. motor 10 to the tool housing 50 is a field retaining clip 52. A preferred embodiment of the field retaining clip 52 is illustrated in FIGS. 5 through 9.

The field retaining clip 52 is preferably manufactured in one piece and is preferably constructed of steel. The clip 52 is generally T-shaped and has a top portion 54 consisting of an elongated head region 56, a neck region 58, and a body region 60. The bottom portion of the clip 62 includes a leg region 64. The elongated head region 56 of the top portion 54 has an inner side 66 and an outer side 68. The leg portion 64 of the clip 52 has an inner side 70 and an outer side 72.

A passageway 80 is formed through the body region 60 of the top portion 52. The leg region 64 of the clip 52 is preferably bent downward such that an arc 82 is formed by the connection of the body region 60 of the top portion 52 and the leg portion 64. In the preferred embodiment, the leg portion 64 extends from the arc 82 such that it is generally perpendicular to the top portion 54. However, the leg portion 64 can extend more than perpendicular or less than perpendicular.

Figure 9:
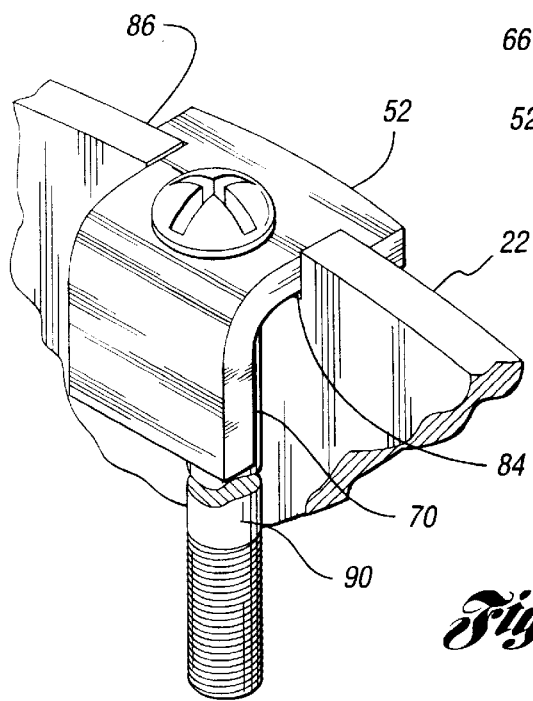
FIG. 9 is a perspective view of the attachment of the field retaining clip to the field shell in accordance with a preferred embodiment of the present invention.

FIGS. 3 and 4 illustrate the clip 52 in a position to secure the field shell 22 of the permanent magnet D.C. motor 10 to the tool housing 50. The field shell 22 has a plurality of notches 84 formed in its surface (FIG. 9). The notches 84 are preferably formed at one end of the field shell 22. In the preferred embodiment, two notches 84 are included and they are formed in the field shell 22 such that they are centered in between the two permanent magnets 42, 44 attached to the inner surface 40 of the field shell 22. The notches 84 are machined into the field shell 22 by stamping or other known methods when the shell blank is fabricated. The notches 84 are also formed such that they have approximately the same width as clips 52 so the clips 52 fit snugly into the notches 84.

FIG. 9 illustrates clip 52 placed into the notch 84 formed in the field shell 22. In the preferred embodiment, each clip 52 is placed into a respective notch 84 such that the elongated head region 56 of the top surface 54 of the clip 52 is adjacent the outer surface 86 of the field shell 22. The inner side 66 of the elongated head region 56 is preferably concave such that the inner side 66 has the same radius of curvature as the outer surface 86 of the field shell 22. The width of the elongated head region 56 is wider than the width of the notch 84. The width of the elongated head region 56 and the concave inner side 66 allows the inner side 66 of the elongated head region 56 to rest against or abut the outer surface 86 of the field shell 22 to secure the clip 52 in the notch 84.

Once the clip 52 is secured in the notch 84, the field shell 22 can be secured to the tool housing 50. This is done by inserting a fastener such as screw 90 through the tool housing 50 and the passageway 80 in the clip 52. After passing through the passageway 80, the fastener 90 contacts the inner side 70 of the bottom portion 62 of the clip 52. This prevents the fastener 90 from turning or otherwise becoming loosened, thus providing a secure attachment of the field shell 22 to the tool housing 50. The fastener 90 is preferably a screw, but can be any other commercially available apparatus that will secure the field shell to the tool housing.

As shown in FIGS. 3 and 4, the fastener 90 is preferably attached to the tool housing 50 at one end 92. The fastener 90 then extends through the clip 52 and into the field shell 22. By positioning the fastener 90 such that it extends inside the field shell 22 and generally parallel to its inner surface 40, the attachment of the field shell 22 to the tool housing 50 takes up an insignificant amount of space, and takes up less space than prior attachment mechanisms. This allows the tool housing 50 and thus the tool to be made smaller.

While only one preferred embodiment of the invention has been described hereinabove, those of ordinary skill in the art will recognize that this embodiment may be modified and altered without departing from the central spirit and scope of the invention. Thus, the embodiment described hereinabove is to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. A tool comprising:

a housing;

a permanent magnet D.C. motor located within said housing, said permanent magnet D.C. motor including a pair of permanent magnets, a field shell having an inner surface for supporting said pair of permanent magnets, an outer surface, and an end having a plurality of notches formed therein;

a plurality of generally T-shaped clips each having a top portion including an elongated head and a relatively smaller neck sized to fit within the plurality of notches, such that an inner surface of said elongated head abuts said outer surface of said field shell, the top portion having a passageway formed therein;

a plurality of fasteners sized for insertion through said passageways for attaching each of said generally T-shaped clips to said tool housing for securing said field shell thereto.

2. The tool of claim 1, wherein each of said generally T-shaped clips further includes a bottom portion that is generally perpendicular to said top portion.

3. The tool of claim 1, wherein said fastener is a screw.

4. The tool of claim 1, wherein said fastener is a bolt.

5. The tool of claim 1, wherein said pair of magnets are spaced apart on said inner side of said field shell such that a space is created between each of said magnets and whereby said notches are formed in said end of said field shell in said space between each of said permanent magnets.

6. The tool of claim 1, wherein said bottom portion of said generally T-shaped clip is bent such that it runs generally parallel to said inner surface of said field shell and into contact with said fastener passed through said passageway to prevent said clip from becoming dislodged from a respective one of said notches.

7. The tool of claim 1 wherein said clip further includes a body region through which said passageway is formed.

* * * * *